Figure 1:
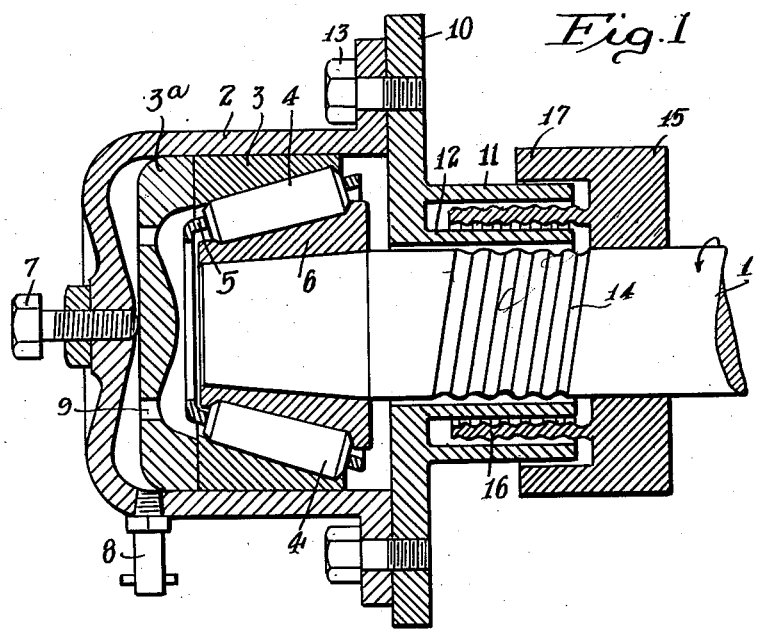

Sept. 17, 1935.   D. MITCHELL, JR   2,014,859

BEARING SEAL

Filed March 3, 1934

Inventor

David Mitchell Jr.

By Lyon & Lyon

Attorneys

Patented Sept. 17, 1935

2,014,859

UNITED STATES PATENT OFFICE 2,014,859

BEARING SEAL

David Mitchell, Jr., Buena Park, Calif.

Application March 3, 1934, Serial No. 713,854

6 Claims. (Cl. 308—187)

This invention relates broadly to bearing constructions for supporting rotating shafts and has as its object to effectively seal a bearing against the entry of dirt, dust and other foreign material injurious to the bearing surfaces.

A serious problem in the design of shaft bearings for axles and the like in tractors and other machines that operate in the presence of excessive quantities of dust, grit and such foreign matter, has been to provide a construction that is effective in excluding the foreign matter from the bearing and yet has a reasonable life. Various types of packing have been resorted to for this purpose but I have found that when used under extremely adverse conditions packing is eventually cut away by gritty foreign matter permitting entry of the matter into the bearing. It has also been proposed to provide bearing constructions in which centrifugal force is utilized to throw off dirt tending to enter the bearing but such structures are ineffective with slowly rotating shafts such as the wheel or track driving shafts of a tractor. In accordance with the present invention, I so construct a bearing as to provide a relatively long tortuous path from the bearing to the exterior between the relatively rotating parts and provide helical grooves on one of the parts so directed as to produce continuous slow flow of grease from the bearing to the exterior, whereby the outwardly moving grease traps and carries away any dirt tending to move toward the bearing. This construction has been found to be remarkably successful in prolonging the life of shaft bearings in tractors operated under conditions which were ruinous to bearings equipped with packing rings for excluding the dirt.

Figure 2:
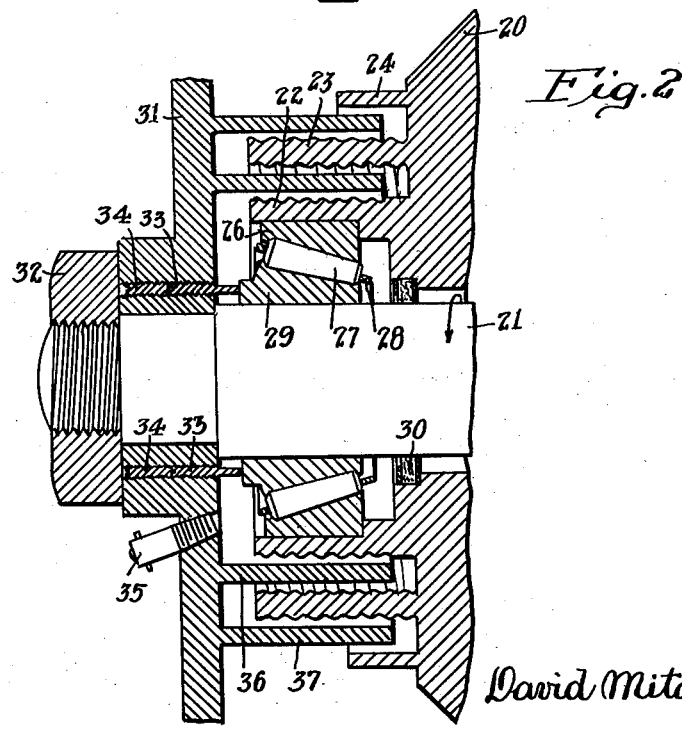

In the drawing:

Fig. 1 is a longitudinal sectional view showing the invention incorporated in a bearing construction for a shaft in which the end of the shaft is enclosed in a stationary housing; and Fig. 2 is a longitudinal sectional view showing the invention incorporated in a bearing construction for a shaft in which the end of the shaft projects beyond the stationary housing.

Referring first to Fig. 1, there is shown a shaft 1, the end of which extends into a stationary housing 2 and is rotatably supported with respect to the housing by a tapered roller bearing assembly comprising a cup 3, rollers 4 supported in a retainer 5, and a cone 6. Thus the cone 6 is mounted on the tapered end of the shaft 1 and the cup 3 is slidably mounted within the housing 2. The cup 3 may be adjusted longitudinally in the housing by means of an adjusting nut 7 which is threaded into the housing and the end of which contacts an adjusting plate 3a which bears against the end of the cup 3. A grease fitting 8 is provided for supplying grease to the interior of the housing 2 and this grease reaches the bearing surfaces through apertures 9 provided for that purpose in the end of the plate 3a.

To seal the bearing against the entry of foreign matter, a flange 10 having a pair of cylindrical sleeves 11 and 12, respectively, formed integrally therewith, is secured to the housing 2 as by cap screws 13. The cylindrical sleeves 11 and 12 are positioned concentrically with respect to each other and to the shaft 1. The inner face of the inner sleeve 12 is spaced sufficiently from the shaft 1 to give clearance therebetween and the surface of the shaft is provided with helical grooves 14 so directed that during normal rotation of the shaft 1 in the direction indicated by the arrow the grooves tend to urge grease in the space between the shaft and the sleeve 12 to the right away from the bearing.

Secured to the shaft 1 adjacent the end of the sleeves 11 and 12 is a flange member 15 having a cylindrical sleeve 16 projecting therefrom into the space between sleeves 11 and 12, and a cylindrical sleeve 17 which overhangs the sleeve 11. Both the inner and outer faces of the sleeve 16 are provided with helical grooves, the grooves on the inner face being so directed as to urge grease in the space between sleeves 16 and 12 to the left in response to rotation of shaft 1 in the direction indicated by the arrow, and the outer surface of sleeve 16 is provided with grooves so directed as to urge grease in the space between sleeve 16 and sleeve 11 to the right in response to normal rotation of the shaft.

The construction disclosed in Fig. 1 functions as follows: The entire space within the housing 2 is normally filled with grease inserted through the fitting 8, this supply being replenished from time to time so that the excess grease is forced through the bearing and into the space between the shaft 1 and the sleeve 12. Thereafter rotation of the shaft 1 slowly shifts the grease to the right and thence into the annular space between sleeves 12 and 16. The grooves on the inner surface of sleeve 16 continue the flow of the grease therepast and likewise when this grease reaches the annular space between the sleeve 16 and the sleeve 11, the grooves on the outer surface of sleeve 16 continue to urge the grease toward the exterior of the bearing. The result is that a small quantity of grease is being continually forced outwardly through the tortuous path provided between the sleeves 11 and 16 and 12 to the annular passage between sleeve 17 and sleeve 11, at the orifice of which passage the grease accumulates as a ring which in itself may provide sufficient seal to prevent the admission of dirt. However, even should there be a great deal of foreign matter present in the air surrounding the bearing so that this foreign matter mixes with the grease being discharged from the bearing, the foreign matter cannot find its way into the bearing against the normal flow of grease from the bearing to the exterior.

The construction disclosed in Fig. 2 functions in substantially the same identical manner as the structure disclosed in Fig. 1. In Fig. 2 the stationary bearing supporting member 20 is positioned about the shaft 21 but does not extend over the end of the shaft. The housing 20 is provided with three concentric flanges or sleeves 22, 23 and 24, respectively, the inner flange 22 serving to support the cup 26 of a conical roller bearing which, in addition to cup 26, comprises rollers 27 mounted in a retainer 28 and a cone 29 which is mounted upon the shaft 21. A grease retaining packing ring 30, of felt or similar material, may be provided between the shaft 21 and the housing member 20 if it is desired to prevent grease from the bearing passing back along the shaft. However, in some instances it may be desired to supply grease from some source spaced back along the shaft 21, in which case the retaining packing ring 30 would be dispensed with.

Rigidly secured to the outer end of the shaft 21 is a flange member 31 which may be mounted on an end portion of the shaft 21 of reduced diameter and secured in place by a nut 32 as shown. To permit ready adjustment of the bearing cone 29 along the shaft 21, headless screws 33 may be provided in the flange 31 at diametrically opposite points thereon, which screws after being adjusted may be locked in position by means of headless lock screws 34. A grease fitting 35 may be provided in the flange 31 for supplying grease to the bearing.

Flange 31 is provided with a pair of inwardly extending concentric sleeves 36 and 37, respectively, which extend ito the annular spaces between the stationary sleeves 22 and 23, and 23 and 24, as shown. The outer surface of the flange or sleeve 22 and both the inner and outer surfaces of the flange 23 are provided with helical screws so directed as to urge grease from the bearing to the exterior precisely as described in connection with the embodiment shown in Fig. 1.

Although the invention has been disclosed with reference to two particular embodiments commonly employed in tractors, it is to be understood that the invention resides broadly in the principle of providing a relatively long tortuous path from the bearing to the exterior between the stationary and rotating parts and providing helical grooves in some at least of the surfaces defining the path so directed as to produce a constant flow of grease from the bearing to the exterior. The invention is therefore to be limited only as set forth in the appended claims.

I claim:

1. In a bearing structure, a pair of relatively rotatable members, a bearing interposed between said members for maintaining them in alignment, a casing enclosing said bearing, said casing comprising a pair of cooperating casing members secured respectively to said two relatively rotatable members, one of said casing members including a plurality of concentric sleeves extending toward the other casing member and the said other casing member including a concentric sleeve extending into the annular space between adjacent sleeves on said first mentioned casing member, and means through which grease may be supplied directly to the bearing, the surfaces of at least one of said sleeves having helical grooves therein so directed as to urge grease in the space between the sleeves away from the bearing in response to normal relative rotation between said rotatable members.

2. In a shaft bearing assembly, a shaft, a stationary housing surrounding said shaft adjacent one end thereof, a bearing between the housing and shaft for rotatably supporting the shaft from the housing, a pair of radially spaced annular sleeves projecting from said housing concentrically with respect to said shaft, a flange on said shaft, one face of which is juxtaposed to the ends of said concentric sleeves, and a sleeve projecting from said flange into the annular space between said spaced concentric sleeves, whereby said sleeves on the housing and flange respectively define a narrow tortuous path from said bearing to the exterior of said housing, means through which grease may be supplied directly to said bearing, and helical grooves on one at least of each pair of juxtaposed sleeve surfaces so directed as to urge grease in said tortuous path away from the bearing in response to normal rotation of said shaft, whereby any dirt tending to enter said bearing through said path is carried back away from the bearing by a slow but continuous outward flow of grease through said path.

3. In a shaft bearing assembly, a shaft, a stationary housing surrounding one end of the shaft enclosing the end of the shaft, a bearing within the housing for rotatably supporting the shaft from the housing, said housing terminating on the side of the bearing remote from said end of the shaft in a pair of radially spaced concentric sleeves, the inner of which sleeves is closely adjacent to and surrounds said shaft, a flange on said shaft having an end face juxtaposed to the ends of said concentric sleeves on said housing, and a sleeve extending from said end face of said flange into the annular space between said concentric sleeves, whereby said sleeves on the housing and shaft respectively define a narrow tortuous path from said bearing to the exterior of said housing, means through which grease may be directly supplied to said bearing, and helical grooves on said shaft and the sleeve attached thereto so directed with reference to the normal direction of rotation of said shaft as to urge grease in said tortuous path away from the bearing in response to normal rotation of said shaft, whereby any dirt tending to enter the bearing through said path is carried back by the outward movement of the grease.

4. A seal structure for preventing the entry of dust, dirt and the like into a bearing casing having means for supplying grease thereto and comprising a pair of relatively rotatable members, said seal structure comprising a plurality of concentric sleeves on one of said members, said sleeves extending toward the other member, and a concentric sleeve on the said other member extending into the annular space between adjacent sleeves on said first mentioned member, the surfaces of at least one of said sleeves having helical grooves therein so directed as to urge grease in the space between the sleeves out of the casing in response to normal relative rotation between said rotatable members.

5. A seal for a shaft bearing assembly comprising a shaft, a stationary housing surrounding the shaft adjacent one end thereof, said housing having means through which grease may be supplied directly thereto, and a bearing between the housing and shaft for rotatably supporting the shaft from the housing; said seal comprising a pair of radially spaced annular sleeves projecting from said housing concentrically with respect to said shaft, and a flange on said shaft, one face of which is juxtaposed to the ends of said concentric sleeves, and a sleeve projecting from said flange into the annular space between said spaced concentric sleeves on said housing, whereby said sleeves on the housing and on the flange respectively define a narrow tortuous path from said bearing to the exterior of said housing, at least one of each pair of juxtaposed sleeve surfaces having helical grooves thereon so directed as to urge grease in said tortuous path away out of the housing in response to normal rotation of said shaft whereby any dirt tending to enter said bearing through said tortuous path is carried back away from the bearing by a slight but continuous flow of grease through said path.

6. A seal for a shaft bearing assembly comprising a shaft, a stationary housing surrounding one end of the shaft and enclosing the end of the shaft and having means thereon through which grease may be directly supplied to said housing, and a bearing within the housing for rotatably supporting the shaft from the housing; said seal comprising a pair of radially spaced concentric sleeves on the side of the housing remote from said end of the shaft, the inner of which sleeves is closely adjacent to and surrounds said shaft, and a flange on said shaft having an end face juxtaposed to the ends of said concentric sleeves on said housing, and having a sleeve extending from said end face of said flange in which the annular space between said concentric sleeves on said housing, whereby said sleeves on the housing and shaft respectively define a narrow tortuous path from said bearing to the exterior of said housing, said shaft and the sleeve attached thereto having helical grooves thereon so directed that the normal direction of rotation of said shaft is to urge grease in said tortuous path away from the bearing in response to normal rotation of said shaft, whereby any dirt tending to enter the bearing through said path is carried back by the outward movement of the grease.

DAVID MITCHELL, Jr.